(12) United States Patent
Foltynowicz

(10) Patent No.: US 8,837,538 B2
(45) Date of Patent: Sep. 16, 2014

(54) HIGH-ENERGY, BROADBAND, RAPID TUNING FREQUENCY CONVERTER

(71) Applicant: Utah State University Research Foundation, North Logan, UT (US)

(72) Inventor: Robert Foltynowicz, Smithfield, UT (US)

(73) Assignee: Utah State University Research Foundation, North Logan, UT (US)

( * ) Notice: Subject to any disclaimer, the term of this patent is extended or adjusted under 35 U.S.C. 154(b) by 91 days.

(21) Appl. No.: 13/627,421

(22) Filed: Sep. 26, 2012

(65) Prior Publication Data
US 2013/0027708 A1    Jan. 31, 2013

Related U.S. Application Data

(63) Continuation-in-part of application No. 13/160,737, filed on Jun. 15, 2011.

(60) Provisional application No. 61/360,293, filed on Jun. 30, 2010.

(51) Int. Cl.
| | |
|---|---|
| *H01S 3/10* | (2006.01) |
| *G02F 1/39* | (2006.01) |
| *H01S 3/00* | (2006.01) |
| *G02F 1/35* | (2006.01) |
| *H01S 3/23* | (2006.01) |

(52) U.S. Cl.
CPC ............... *H01S 3/0092* (2013.01); *G02F 1/39* (2013.01); *G02F 2001/3542* (2013.01); *G02F 2001/392* (2013.01); *H01S 3/2391* (2013.01)
USPC .......................................................... 372/28

(58) Field of Classification Search
CPC ......... H01S 5/14; H01S 5/10; H01S 5/02438; H01S 3/2391; G02F 2001/392; G02F 2001/3542; G02F 1/39

USPC .......................................... 372/21, 28, 92, 94
See application file for complete search history.

(56) References Cited

U.S. PATENT DOCUMENTS

| | | | |
|---|---|---|---|
| 5,841,570 A | 11/1998 | Velsko | |
| 6,421,166 B1 | 7/2002 | Velsko | |
| 8,218,588 B1 | 7/2012 | Bartholomew et al. | |
| 2008/0089369 A1* | 4/2008 | Luo et al. | 372/28 |

FOREIGN PATENT DOCUMENTS

| | | | | |
|---|---|---|---|---|
| JP | 10268369 A | | 10/1998 | |
| WO | 2004-049056 | * | 6/2004 | G02F 1/39 |

(Continued)

OTHER PUBLICATIONS

International Search Report and the Written Opinion of the International Searching Authority for PCT/US2012/057317, Transmitted Apr. 30, 2013.

(Continued)

*Primary Examiner* — Tuan Nguyen

(57) ABSTRACT

An Optical Parametric Oscillator (OPO) capable of rapid or broadband frequency tuning by non-mechanical or mechanical means includes a resonant cavity with one or more non-linear crystals in an optical path thereof. The non-linear crystals may be driven by actuators. A pump laser pulse is transmitted into the resonant cavity with one or more seed beams having a desired wavelength. The output beam from the resonant cavity may have the same center wavelength as the one or more seed beams which may be modulated at a frequency larger than that of the pump laser, or the inverse of the pulse duration. The OPO may be used in Light Detection And Ranging (LIDAR) or Differential Absorption LIDAR (DIAL) analysis by intra-pulse modulation of output to measure absorption at multiple frequencies for each pulse of a pump beam. Sum Frequency Generator configurations may be suitable for narrow and broadband UV generation.

18 Claims, 11 Drawing Sheets

(56) References Cited

FOREIGN PATENT DOCUMENTS

| | | |
|---|---|---|
| WO | 2004049056 A1 | 6/2004 |
| WO | 2005053119 A1 | 6/2005 |

OTHER PUBLICATIONS

Webb, High-average power KTiOAsO4 optical parametric oscillator. Optics Letters, Feb. 2, 1998, 1161-1163, vol. 23, No. 15.

Gong, Eye-safe compact scanning LIDAR technology, Optics and Lasers in Engineering, Apr. 12, 2007, 898-906, vol. 45, Cambridge MA.

Isyanova Y and Moulton P, Injection-seeded, pump-enhanced, tunable KTA OPO, Conference paper, Optical Society of America, Advanced Solid State Lasers, Feb. 15, 2000,1-10, Q-Peak Inc., Bedford MA.

Chaung, A KTA optical parametric oscillator pumped by a Q-switched, injection seeded Nd:YAG laser, Conference Paper, Optical Society of America, Advanced Solid State Lasers, 1996.

\* cited by examiner

HIGH-ENERGY, BROADBAND, RAPID TUNING FREQUENCY CONVERTER

RELATED APPLICATIONS

This application is a continuation in part of U.S. patent application Ser. No. 13/160,737, filed Jun. 15, 2011 and entitled OPTICAL PARAMETRIC OSCILLATOR WITH RAPID NON-MECHANICAL FREQUENCY TUNING, which claims the benefit of U.S. Provisional Application 61/360,293, filed Jun. 30, 2010 and entitled METHOD AND SYSTEM FOR NON-MECHANICAL RAPID TUNING OF AN OPTICAL PARAMETRIC OSCILLATOR, both of which are incorporated herein by reference in their entirety.

TECHNICAL FIELD

This invention relates to apparatuses, methods, and systems for tuning optical beams, and in particular, to apparatuses, methods, and systems for generating high-pulse energies with an ability to change wavelengths.

SUMMARY

The present disclosure in aspects and embodiments describe devices, systems, and methods for a high-energy, broadband, rapid tuning frequency generator that may be embodied as an optical parametric oscillator, (OPO), especially in light regions from the near infrared (NIR) to the ultraviolet (UV).

In embodiments, a laser system includes a pump laser configured to generate a pump beam having a pump wavelength and a pulse repetition frequency (PRF); a resonant cavity positioned to receive the pump beam; a non-linear crystal positioned within the resonant cavity such that the non-linear crystal and resonant cavity have a band of lasing wavelengths including wavelengths other than the pump wavelength, the non-linear crystal operable to output a signal beam in response to the pump beam; a seed laser positioned to emit a seed signal into the resonant cavity, the seed signal having a seed wavelength and the seed wavelength being within the band of lasing wavelengths; a seed laser controller electrically coupled to the seed laser and programmed to modulate the seed wavelength at the PRF of the pump laser; and a sum frequency generator (SFG) positioned to receive a portion of the pump beam and a portion of the signal beam, the SFG operable to output an output beam in response to the portion of the pump beam and the portion of the signal beam.

In another embodiment, the output beam can be modulated at a frequency between about 10 Hz and about 1 GHz. In another embodiment, the output beam is an ultraviolet (UV) beam with a wavelength that is modulated in a band from about 0.3 to about 0.5 nm.

In another embodiment, the non-linear crystal is fixed relative to the resonant cavity.

In another embodiment, the seed laser includes a first seed laser configured to emit a first seed signal having a first seed wavelength and a second seed laser configured to emit a second seed signal having a second seed wavelength, both the first and second seed lasers positioned to emit their respective signals into the resonant cavity, and both the first and second seed wavelengths being within the band of lasing wavelengths.

In another embodiment, the laser system further includes a crystal actuator coupled to the non-linear crystal. In another embodiment the system further includes a crystal actuator controller electrically coupled to the crystal actuator, the crystal actuator controller programmed to modulate the output beam by driving the crystal actuator.

In another embodiment the system further includes an SFG actuator controller electrically coupled to an SFG actuator, the SFG actuator controller programmed to modulate the output beam by driving the SFG actuator.

In another embodiment, the output beam is an ultraviolet (UV) beam with a wavelength that is modulated in a band from about 0.5 to about 4 nanometers.

In other embodiments, a method for operating a laser includes generating a pump beam at a pump wavelength and a pump pulse repetition frequency (PRF); transmitting the pump beam into a resonant cavity having a non-linear crystal in an optical path thereof, the non-linear crystal operable to emit a signal beam in a band of lasing wavelengths that includes wavelengths different from the pump wavelength; generating a seed beam having a seed wavelength lying within the band of lasing wavelengths; modulating the seed wavelength at a frequency greater than or equal to the pump PRF; transmitting the seed beam into the resonant cavity; transmitting a portion of the signal beam and a portion of the pump beam into a sum frequency generator (SFG); and outputting an output beam from the SFG.

In another embodiment, modulating the seed wavelength causes a corresponding modulation of an output wavelength of the output beam.

In another embodiment, the output beam is a UV beam and modulating the seed wavelength causes a corresponding modulation of the UV beam in a band between about 0.3 and 0.5 nanometers wide.

In another embodiment, generating the seed beam includes activating a laser diode; and modulating the seed wavelength includes modulating current supplied to the laser diode.

In another embodiment, the output beam can be modulated at a frequency between about 10 Hz and about 1 GHz (e.g., 1, 2, 3, 4, 5, 6, 7, 8, 9, or 10 GHz).

A method for operating a laser described in the embodiments above includes: generating a pump beam with a pump beam wavelength at a pump pulse repetition frequency (PRF); transmitting the pump beam into a resonant cavity having a non-linear crystal in an optical path thereof, the non-linear crystal being operable to emit a signal beam in a band of lasing wavelengths that includes wavelengths different from the pump beam wavelength; generating a first seed beam having a first seed wavelength lying within the band of lasing wavelengths; generating a second seed beam having a second seed wavelength lying within the band of lasing wavelengths, the second seed wavelength being different from the first seed wavelength; transmitting the first and second seed beams into the resonant cavity; transmitting a portion of the signal beam and a portion of the pump beam into a sum frequency generator (SFG); outputting an output beam having an output beam wavelength from the SFG; and modulating the output beam wavelength by actuating the non-linear crystal.

In another embodiment of a method, modulating the output beam wavelength includes actuating the non-linear crystal effectively to modulate the output beam wavelength at a frequency greater than or equal to the pump PRF.

In another embodiment of a method for operating a laser, actuating the non-linear crystal includes actuating the non-linear crystal effective to modulate the signal beam between the first seed wavelength and the second seed wavelength.

In another embodiment, a method for operating a laser further includes actuating the SFG in correspondence with actuation of the non-linear crystal.

In another embodiment of a method for operating a laser, the output beam is a UV beam and actuating the non-linear crystal includes actuating the non-linear crystal effective to modulate the wavelength of the UV beam over a range from about 0.5 to about 4 nanometers.

In another embodiment of the present disclosure, a gas characterization system includes: a pump laser configured to generate a pump beam having a pump wavelength at a pulse repetition frequency (PRF); a resonant cavity positioned to receive the pump beam; a non-linear crystal positioned within the resonant cavity such that the non-linear crystal and resonant cavity have a band of lasing wavelengths including wavelengths other than the pump wavelength, the non-linear crystal operable to output a signal beam in response to the pump beam; a seed laser positioned to emit a seed signal into the resonant cavity, the seed signal having a seed wavelength being within the band of lasing wavelengths; a seed laser controller electrically coupled to the seed laser and programmed to modulate the seed wavelength at a frequency at least as great as the PRF; a sum frequency generator (SFG) positioned to receive a portion of the pump beam and a portion of the signal beam, the SFG operable to output an output beam in response to the portion of the pump beam and the portion of the signal beam; a detector configured for receiving a reflected portion of the output beam from a region of interest; a measurement module configured to receive an output from the detector and produce a measurement of the reflected portion of the output beam; and an analysis module configured to analyze the measurement from the measurement module and characterize a gas in the region of interest.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, embodiments will be described with additional specificity and detail through use of the accompanying drawings in which:

DETAILED DESCRIPTION

Figure 1:
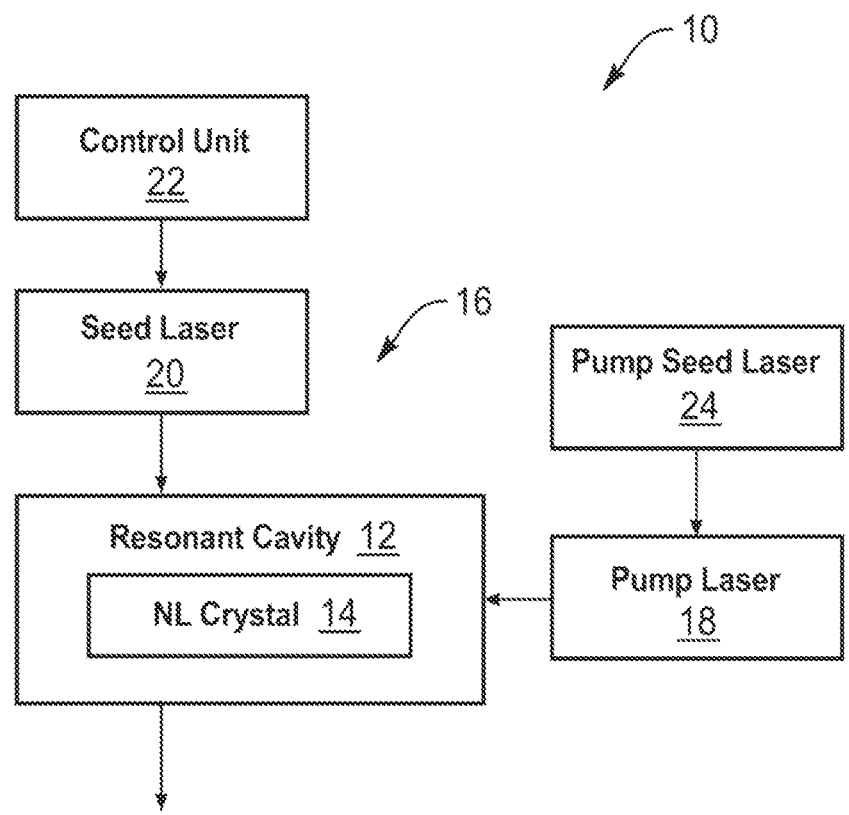
FIG. 1 is a schematic block diagram of an embodiment of an OPO system in accordance with the present disclosure.

The present disclosure covers systems, devices, and associated methods for tuning an Optical Parametric Oscillator (OPO). In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

Referring to FIG. 1, an optical parametric oscillator (OPO) system 10 includes a resonant cavity 12 having a non-linear crystal 14 located in an optical path of a laser beam within the resonant cavity 12. The combination of non-linear crystal 14 and resonant cavity 12 may define an OPO 16.

A pump laser 18 transmits pulses into the resonant cavity 12. The pulses have a pulse wavelength and corresponding frequency and are emitted periodically at a pulse rate or pulse repetition frequency. The pulses likewise have a pulse duration that may be less than the inverse of the pulse rate (the pulse period). The OPO 16 may further include a seed laser 20 that transmits a seed beam into the resonant cavity 12.

A controller 22 embodied as a general-purpose computer, function generator, or application specific circuit may generate signals for powering one or both of the pump laser 18 and seed laser 20. In some embodiments, a pump seed laser 24 emits a pump seed beam into the pump laser 18 and may also be controlled by the controller 22.

Figure 2:
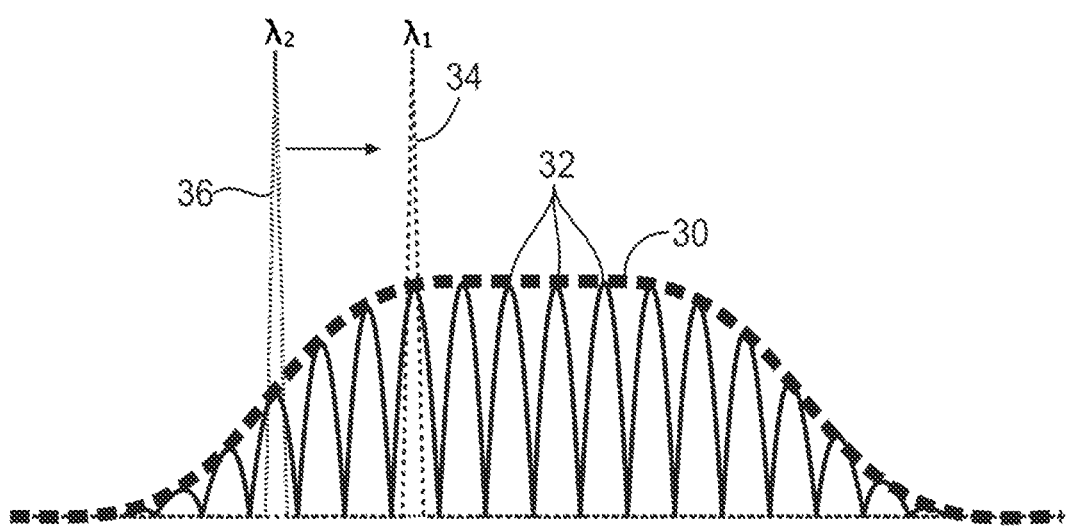
FIG. 2 is a plot of the gain bandwidth and resonant modes of an OPO.

Referring to FIGS. 1 and 2, the resonant cavity 12 and non-linear crystal 14 may create through the input of a pump laser 18 both a gain bandwidth 30 and a plurality of cavity modes 32 that are bounded by the gain bandwidth 30. The gain bandwidth 30 results from properties of the non-linear crystal 14 and the geometry of the resonant cavity 12. The gain bandwidth 30 is the range of frequencies or corresponding wavelengths at which light amplification will occur within the non-linear crystal 14 when powered by the pump laser 18.

The cavity modes 32 represent the frequencies or wavelengths at which standing waves can occur within the resonant cavity 12 and may therefore be significantly amplified. Each of the modes 32 lying within the gain bandwidth 30 may be amplified and present in an output beam of the resonant cavity 12 when only the pump laser 18 is transmitted into the resonant cavity 12.

The seed laser 20 transmits light into the resonant cavity 12 with a frequency or wavelength within the gain bandwidth 30 and results in selection of one of the modes 32 corresponding to the frequency of the seed laser 20. Photons of the seed laser beam incident on the non-linear crystal 14 produce additional photons (i.e., greater power than the original seed laser beam) with identical phase, wavelength, and frequency being emitted from the crystal. Accordingly, the seed laser 20 ensures that photons with the seed laser frequency will dominate and reduce the number of photons emitted corresponding to the other modes 32.

The seed laser 20 may be frequency tunable and therefore can be modulated to select one of the modes 32 and thereby control the output of the resonant cavity 12 within the bounds of the gain bandwidth 30. For example, the seed laser 20 may provide a beam with a first frequency profile 34 ($\lambda_1$) corresponding to one of the frequency modes 32. The first frequency profile 34 ($\lambda_1$) can be obtained by transmitting a seed beam from the seed laser 20, the seed beam having a center frequency proximate the center frequency of the first frequency profile 34 ($\lambda_1$), into the resonant cavity 12.

By modulating the seed laser 20 to emit a second beam with a second frequency, a second frequency profile 36 ($\lambda_2$) with a center frequency at a different mode 32 may be obtained at the output of the resonant cavity 12. Note that no modification of the resonant cavity 12 or properties of the non-linear crystal 14 is required. Frequency modulation of the output of the OPO 16 may therefore be made by changing the modulation frequency of the seed laser 20 and the relaxation oscillation response of the OPO 16.

Figure 3:
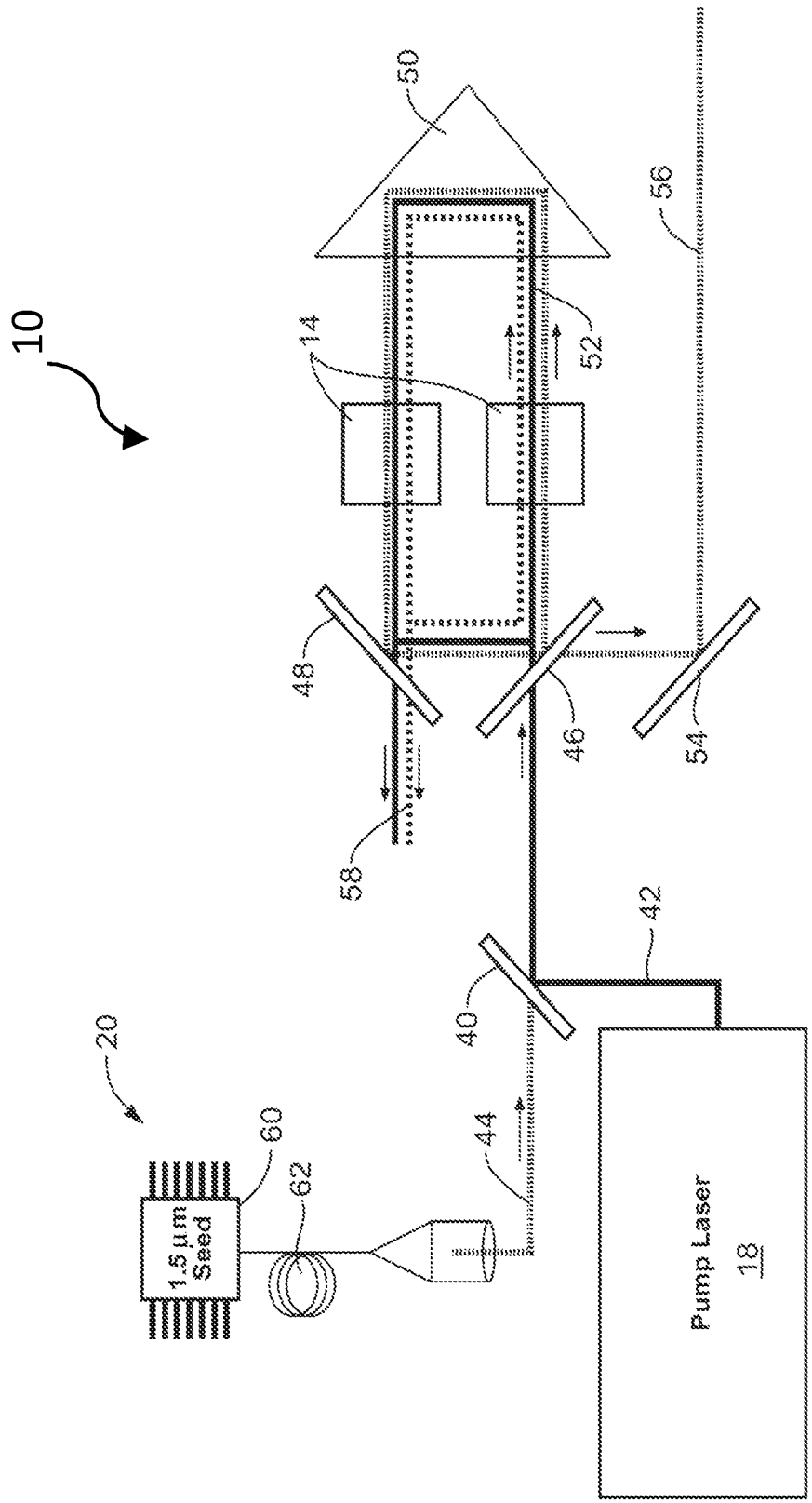
FIG. 3 is a schematic block diagram of an implementation of one embodiment of an OPO system in accordance with the present disclosure.

FIG. 3 illustrates an implementation of an OPO system 10. In the illustrated embodiment, the pump laser 18 may be a laser of type Nd:YAG, Nd:YLF, Tm:YAG, Ho:YAG, Er:YAG, KrF, or the like. In particular, a high power, single mode, Q-switched Nd:YAG, laser injection seeded at 1064 nm, has been found to be workable.

The pump laser 18 typically emits at a wavelength different from that of the output beam 56 of the OPO system 10. For example, in the illustrated implementation where an Nd:YAG pump laser 18 is used, the pump wavelength may be 1064 nm and the output beam 56 wavelength may be 1.5 µm.

A typical non-linear crystal emits at two wavelengths when excited by a pump laser. The two wavelengths are called the idler beam and signal beam by convention. In the illustrated embodiment, the signal beam is the output and the idler beam has a wavelength of 3.4 µm.

In the illustrated embodiment of FIG. 3, a dichroic mirror 40 combines a pump beam 42 emitted by the pump laser 18 and a seed beam 44 emitted from the seed laser 20. The pump beam 42 and seed beam 44 are incident on opposing surfaces of the dichroic mirror 40, which is oriented at an angle of 45 degrees with respect to each beam 42, 44. The dichroic mirror 40 may be highly reflective at the pump laser wavelength and transmissive at the seed laser wavelength.

The resonant cavity 12 may be a ring resonator cavity defined by two dichroic mirrors 46, 48, and a turning prism 50, that establish a rectangular path followed by a circulating beam 52 within the resonant cavity 12. Tuning prism 50 may also be replaced by two or more dichroic mirrors, as shown in other embodiments. Other resonant cavity configurations known in the art may also be used, including, but not limited to, a linear optical path OPO cavity.

The circulating beam 52 may propagate in the counter clockwise direction such that light transmitted through the mirror 46 is incident on the turning prism 50, which redirects incident light onto the mirror 48. The mirror 48 directs incident light onto the mirror 46, and the cycle continues.

The illustrated resonant cavity 12, using a turning prism and dichroic mirrors 40, 46, and 48, enables isolation of the pump laser 18 from the resonant cavity without the use of a Faraday isolator. However, other resonant cavities making use of Faraday isolators may also benefit from aspects of the present disclosure.

The dichroic mirror 48 may be highly reflective of the signal beam wavelength, (the desired output) and highly transmissive of other beam wavelengths. For example, a diagnostic beam 58, including light having the pump and idler wavelengths, may be transmitted through the dichroic mirror 48. The diagnostic beam 58 may be measured for monitoring purposes.

The dichroic mirror 46 may be partially transmissive at the signal wavelength such that a portion of the circulating beam 52 at the signal wavelength will remain within the resonant cavity 12 and a portion will be emitted through the mirror 46. Light transmitted through the dichroic mirror 46 may be incident on another dichroic mirror 54 that is tuned to be highly reflective at the signal wavelength. The output beam 56 reflected from the dichroic mirror 54 may therefore include almost exclusively light at the signal wavelength.

Non-linear crystals 14 may be located within the optical path of the circulating beam 52 within the resonant cavity 12. In the illustrated embodiment, one non-linear crystal 14 is located between the mirror 46 and the turning prism 50 and another between the mirror 48 and the turning prism 50. In embodiments, four non-linear crystals 14 may be used. For example, each non-linear crystal 14 in FIG. 3 may be replaced by two non-linear crystals 14. Alternatively, only one non-linear crystal 14 may be used.

The non-linear crystals 14 may include potassium titanyl arsenate (KTA) crystals. The non-linear crystals 14 may also include other nonlinear media known in the art, including, but not limited to, potassium titanyl phosphate (KTP), rubidium titanyl arsenate (RTA), lithium niobate, silver gallium sulphide (AgGaS2), silver gallium selenide (AgGaSe2), zinc germanium diphosphide (ZnGeP2), cadmium selenide (CdSe), potassium dihydrogen phosphate (KDP), Beta barium borate (BBB), lithium boron oxide (LBO), and cesium lithium borate (CLBO).

The non-linear crystals 14 may be non-critical phase matching (NCPM) crystals that allow a large acceptance angle for the pump laser 18, such as the illustrated pump laser 18 embodied as a single mode pump source. In addition, given the large bandwidth acceptance at NCPM, the seed laser 20 can drive the OPO system 10 to emit at arbitrary injection seeded wavelengths of frequencies across a wide wavelength or frequency band. Note that no mechanical tuning is required to obtain a change in wavelength at the output of the OPO system 10.

The resonant cavity 12 may be actively stabilized through temperature control or by using a piezo transducer or other line-locking (e.g., dithering) schemes to further enhance the frequency control of the resonant cavity 12.

In embodiments, the position or orientation of the non-linear crystals 14 in the system may be fixed. The angle of the non-linear crystals may also not change for purposes of tuning the output signal. Likewise, the angle of incidence of the pump beam 42 and seed beam 44, with respect to the non-linear crystals 14, may also be fixed.

In some embodiments, the gain bandwidth 30 may be shifted by altering one or more of the orientation, temperature, and pressure of the non-linear crystals 14 or by altering an applied voltage to the non-linear crystals 14. Modification of the angle of incidence of a pump beam 42 may also be used to shift the gain bandwidth 30. Shifting may enable access to a different frequency band within which rapid tuning may occur. In embodiments, rapid frequency tuning above the pulse rate or at a modulation frequency above the inverse of the pulse duration is preferably performed by frequency modulation of the seed laser 20.

The seed laser 20 may be embodied as a laser diode 60 coupled to the resonant cavity 12 by means of a fiber optic cable 62. However, any laser known in the art that can be rapidly tuned by current or voltage at frequencies comparable to the pulse rate or the inverse of the pulse duration may be used. In embodiments where mechanical means are used to change the gain bandwidth 30, any laser known in the art may be used, regardless of the laser's ability to be rapidly tuned (or frequency modulated).

A frequency agile 1.5 μm diode laser that produces a narrow linewidth signal wave at 1.533 μm has been found to provide good performance. Laser diodes may be frequency tunable by modulating a drive current and therefore provide a high degree of frequency agility. For example, a laser diode may have a wavelength modulation frequency as large as 10 Hz, 1 kHz, 1 MHz, 1 GHz. For example, the laser diode may have a wavelength modulation frequency between about 10 Hz and about 1 GHz, or between about 1 kHz and about 1 MHz, or between about 1 MHz and about 1 GHz, or between about 1 kHz and about 1 GHz (e.g., 1, 2, 3, 4, 5, 6, 7, 8, 9, or 10 GHz). The laser diode modulation frequency may correspond to the output beam 56 being modulated at the same frequency or frequency range.

The laser diode 60 may have a wavelength modulation frequency, or pulse repetition frequency greater than or equal to the pulse repetition frequency of the pump laser or the inverse of the pulse duration. For example, in the illustrated embodiment, the pump laser 18 may have a pulse rate of 30 Hz with a pulse duration of 10 ns. The laser diode 60 in such an embodiment may have a wavelength modulation frequency that is greater than or equal to about 30 Hz, or greater than or equal to about 100 MHz (1/(10 ns)).

In illustrative experiments, upon interaction with the KTA non-linear crystals 14, a 1.5 μm signal beam was generated with a bandwidth of approximately 60 GHz. To narrow the bandwidth of the 1.5 μm signal beam, a 1.5 μm seed laser 20 was used to select a mode from this 60 GHz bandwidth. As a result, the bandwidth of the 1.5 μm OPO output went from 60 GHz to about 120 MHz. As described above with respect to FIG. 2, any mode within the 60 GHz bandwidth could have been selected by tuning the wavelength of the seed laser 20 to the mode.

Figure 4:
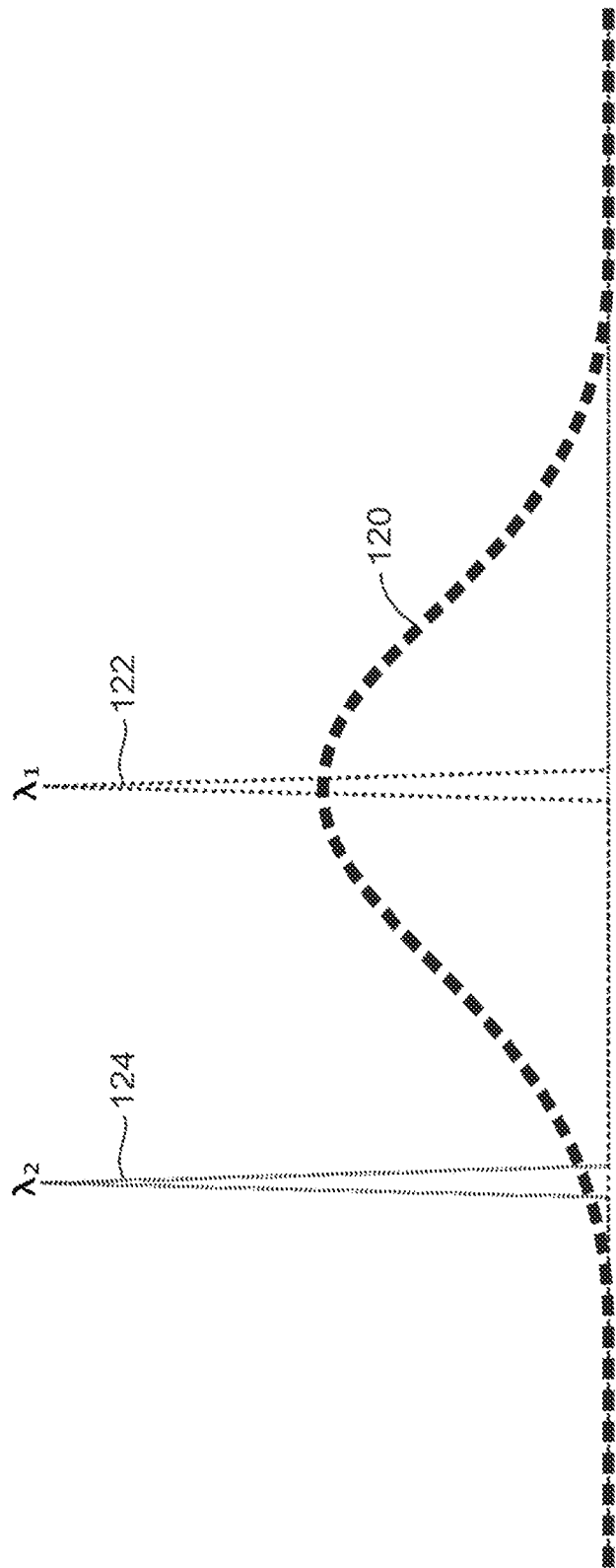
FIG. 4 is a plot of a gas absorption band and OPO output frequencies.

Referring to FIG. 4, an OPO system may be used to perform differential absorption light detection and ranging (DIAL). Gases within the atmosphere have an absorption spectrum with multiple bands of high absorption. DIAL may be used to quantify the amount of gas within the atmosphere or within a beam's optical path based on the absorption of light by the gas. Detectable gases may include, for example, aerosols, $O_3$, $CH_4$, $N_2O$, HCN, CO, HDO, HCL, HF, $H_2O$, or OCS. In FIG. 4, line 120 represents one absorption band of a gas of interest. In DIAL, gas within a region of interest is irradiated with a beam having a first frequency 122 ($\lambda_1$) and the amount of light backscattered is measured. Gas within the region of interest is then irradiated with a beam having a second frequency 124 ($\lambda_2$). The amount of light backscattered from the region of interest is again measured.

One of the frequencies, 122 or 124, is chosen because it lies within the absorption band 120 at a region of high absorption for a particular gas. The other of the frequencies, 122 or 124, is chosen because it is a frequency at which little absorption occurs for the gas of interest. For example, absorption by a gas present in a beam's optical path (e.g., the atmosphere) at one of the frequencies 122, 124, may be 10% to 90% less than the absorption at the other of the frequencies 122, 124. In some methods, more than one frequency may be used in the high absorption region and more than one frequency may be used in the low absorption region. For example, one frequency may be 90% and a second 60% less than the absorption at the other end of the frequencies 122, 124.

The measurement of backscattered light (e.g. the intensity versus time) at a frequency with little absorption provides a reference for evaluating the measurement of backscattered light at a frequency with high absorption (e.g., frequency 122). By evaluating these measurements, the concentration of the gas having the given absorption band 120 may be characterized. The measurement and evaluation of measurements of backscattered light may be performed according to any methods for performing DIAL known in the art.

The wavelengths of light achievable using the OPO system 10 may be particularly useful in a DIAL system for measuring various gases. For example, the UV wavelengths achievable using the OPO 10 may be particularly useful for measuring sulfur dioxide ($SO_2$). Other wavelengths from the UV to NIR may be useful for measuring $CO_2$, $CH_4$, $NO_s$, $SO_x$, HCN, $H_2O$, $O_3$, Benzene, $H_2S$, Toluene, or other gases. The OPO 10 may be used to generate a modulated output that modulates the wavelength of the output of the OPO at a frequency of high absorption and a frequency of low of absorption for a given gas. The amount of backscattered light responsive to each pulse may then be used to perform DIAL measurements as described above.

Figure 5:
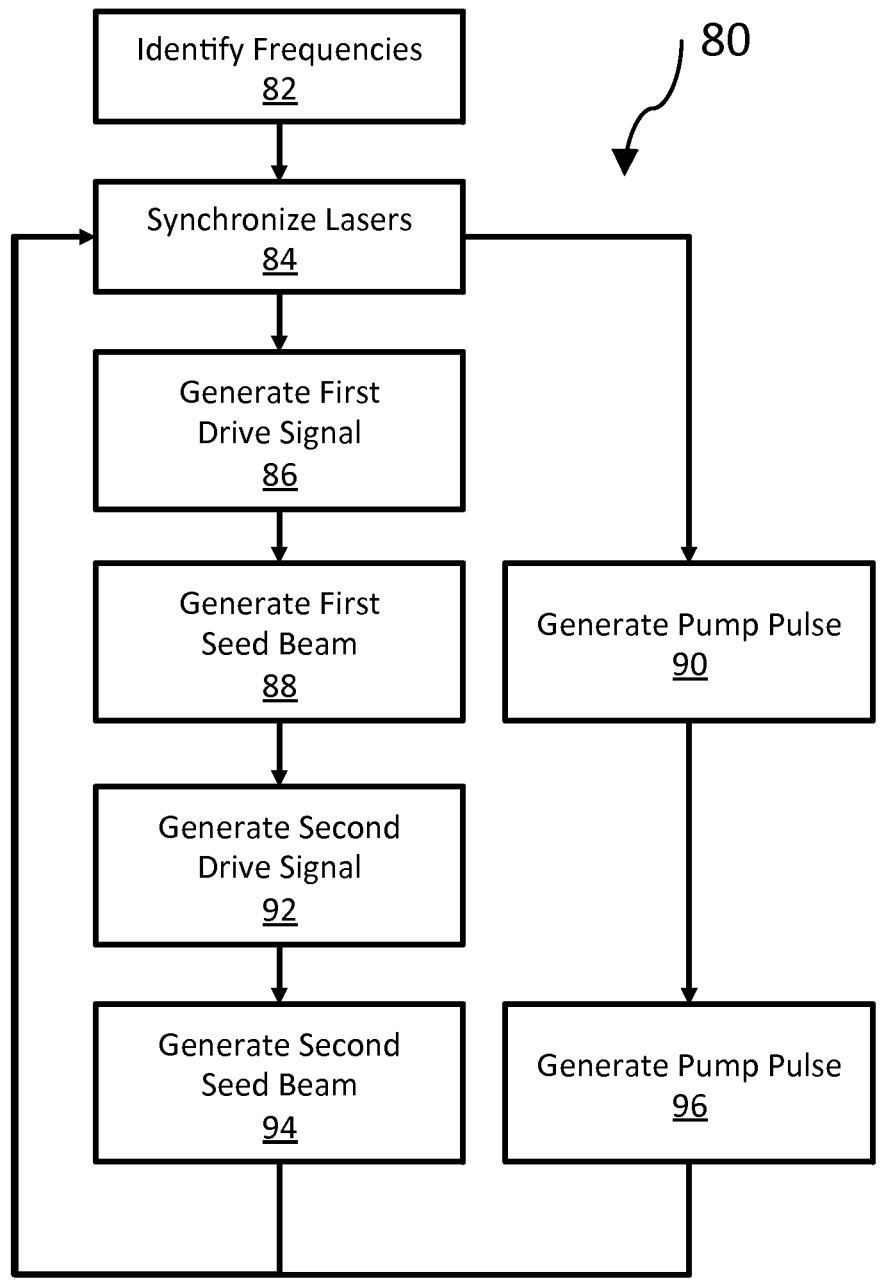
FIG. 5 is a process flow diagram of an embodiment of a method for operating an OPO system in accordance with the present disclosure.

FIG. 5 illustrates a method 80 for operating an OPO system, such as the OPO system described above. The method 80 may be executed by an operator, by a controller 22, or by a combination thereof. The frequencies of the seed laser 20 are identified 82 that are necessary to produce desired output beams 56 with frequencies in regions of high or low absorption for a particular gas. For purposes of this disclosure, frequency and wavelength may be used interchangeably with respect to their description of light. Accordingly, identifying the frequencies 82 of the seed laser 20 light may include identifying 82 the wavelengths of the seed laser light.

In the depicted embodiment, the seed laser 20 and the pump laser 18 are synchronized 84. Synchronization may result in the seed beam and pump pulse being generated simultaneously or substantially overlapping in time (e.g., greater than 80%, preferably greater than 90%, of the pulse duration). As shown in FIG. 3, the seed beam and pump pulse are transmitted into the resonant cavity 12. As described above, the result is an output beam 56 that has a center frequency and wavelength equal to the seed beam 44 frequency and wavelength.

A first drive signal having a current or voltage effective to obtain a first frequency is generated 86. In embodiments, the seed laser 20 is driven with the control signal to generate 88 a seed beam having the selected frequency or wavelength. A pump pulse is also generated 90.

A second drive signal having a current or voltage effective to obtain a second frequency or wavelength may be generated 92. The seed laser 20 is driven with a drive signal to generate 94 a seed beam having a second frequency or wavelength, and a pump pulse is again generated 96, substantially overlapping the seed beam in time. The generation steps 86-94 are preferably performed such that the seed laser 20 is emitting at the desired frequency or wavelength by the time the next pulse is generated 96. That is, immediately following the pulse generated 90 in the previous pulse generation step 90, a new pulse is generated 96 according to the specified pulse rate of the pump laser 18. As noted above, this requires modulating the frequency and wavelength of the seed laser 20 at a frequency greater than the pulse rate.

Figure 6:
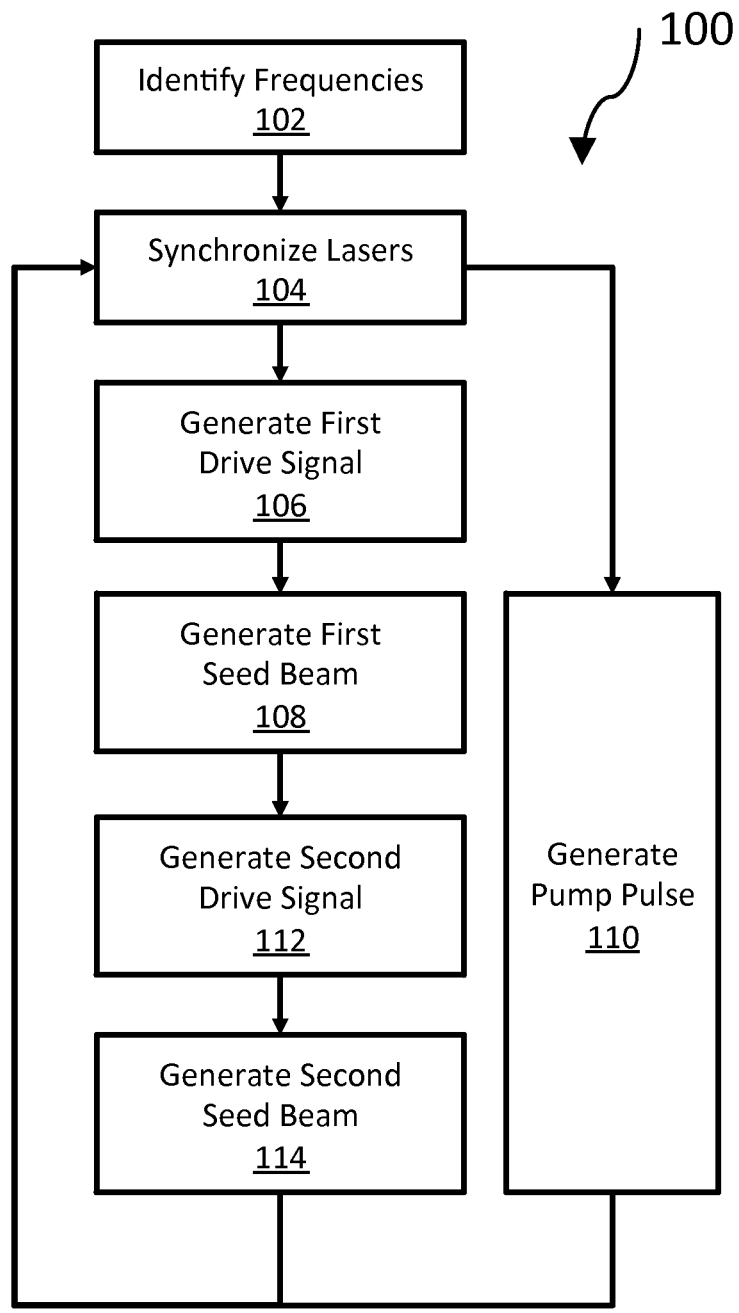
FIG. 6 is a process flow diagram of an alternative method for operating an OPO system.

FIG. 6 illustrates an alternative method 100 for operating an OPO system, such as the OPO system 10 described above. The method 100 includes identifying 102 the frequencies or wavelengths and synchronizing 104 the operation of the seed laser 20 and the pump laser 18. A first drive signal having a controlled voltage, current, or both effective to cause the seed laser 20 to emit at the first frequency or wavelength is generated 106. The seed laser 20 is driven with the first drive signal to generate 108 a seed beam having a first frequency or wavelength. A pump pulse is generated 110 so as to substantially overlap in time with the seed beam.

A second drive signal having a controlled voltage, current, or both effective to cause the seed laser 20 to emit at a second frequency or wavelength is then generated 112. The seed laser 20 is driven with the second drive signal to generate 114 a seed beam having the second frequency or wavelength. Steps 108, 112, and 114 may be performed repeatedly during generation 110 of a single pump pulse. Steps 108, 112, and 114 may be performed in a continuous fashion such that the seed beam sweeps continuously across a range of frequencies during generation 110 of a single pump pulse.

Figure 7:
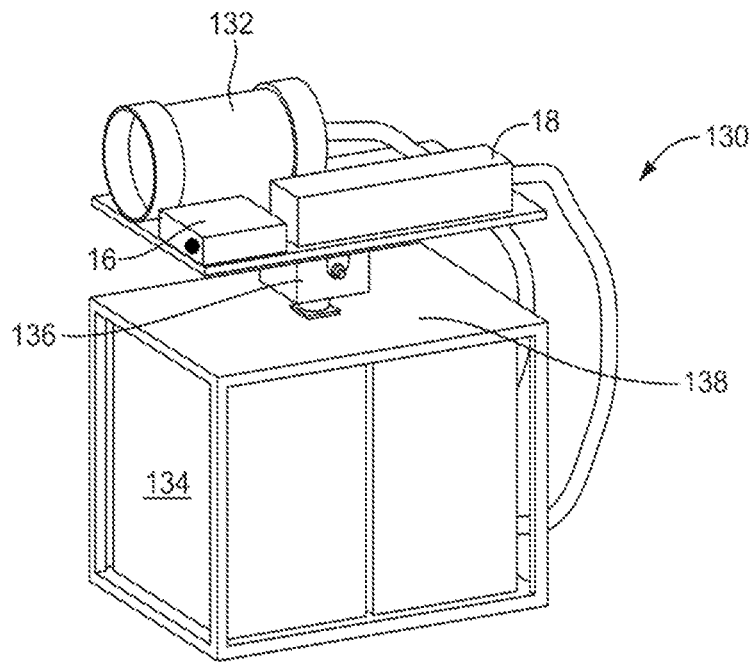
FIG. 7 is an isometric view of an embodiment of a DIAL system in accordance with the present disclosure.

Referring to FIG. 7, an embodiment of a DIAL system 130 may include a pump laser 18 and an OPO 16 as described above. The OPO 16 includes the seed laser 20 as described above in addition to the resonant cavity 12 and the one or more non-linear crystals 14. The DIAL system 130 may further include a detector 132 for receiving backscattered light from a region of interest and a controller 134. The detector 132 may include lenses, for focusing received light, and a light sensor. The detector 132, pump laser 18, and OPO 16 may be mounted to orient actuators 136 for rotating the OPO 16 and detector 132 in both the vertical and horizontal planes. The orientation actuators 136 may mount the pump laser 18, OPO 16, and detector 132 to a housing 138. The controller 134 may be mounted within the housing 138.

Figure 8:
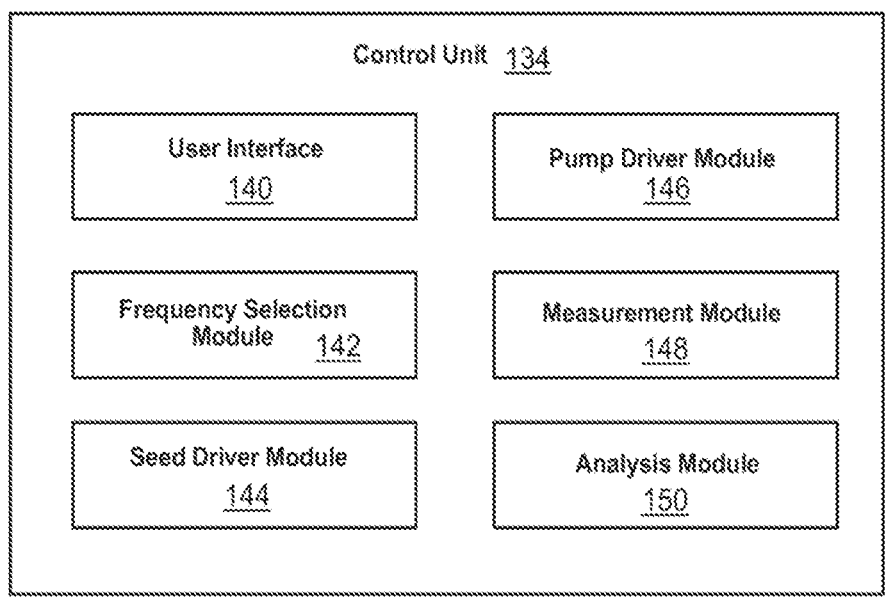
FIG. 8 is a schematic block diagram for an embodiment of a DIAL system in accordance with the present disclosure.

Referring to FIG. 8, the controller 134 may be embodied as a general purpose computer or application-specific computing device. The controller 134 may include a user interface 140 for receiving user instructions and presenting output data. The user interface 140 may include a display screen, keyboard, touch screen, pointing device, or any other data input and output device known in the art.

The controller 134 may further include a frequency selection module 142 that determines at which frequency or wavelength the OPO 16 will emit. The frequency selection module 142 may be instructed to switch between different light frequencies at a switching frequency greater than the pulse rate or greater than the inverse of the pulse duration of the pump laser 18. The frequency selection module 142 may also be instructed to sweep continuously between the two frequencies. The frequency selection module 142 may simply receive a frequency value specified by the user using the user interface 140.

The output of the frequency selection module 142 may be input to a seed driver module 144. The module 144 generates an electrical signal having a voltage and current effective to cause the seed laser 20 to emit at the frequency or wavelength identified by the frequency selection module 142. The output of the seed driver module 144 is coupled to the seed laser 20.

The pump driver module 146 generates a drive signal for the pump laser 18. This may include generating a drive signal for the pump seed laser 24. The pump driver module 146 may generate a pulsed or continuous drive signal and may simply generate a drive signal in response to a user instruction turning on the pump laser 18. Where the pump laser 18 has a tunable frequency, amplitude, pulse rate, pulse duration, or combination thereof, the pump driver module 146 may translate instructions, intended to achieve a desired value for these parameters, into the appropriate drive signal.

The controller 134 may also include a measurement module 148 that receives the output of the detector 132. The measurement module 148 may include any device, software module, or both, known in the art to be capable of measuring back-scattered or reflected light in a DIAL system. The controller 134 may further include an analysis module 150 including any device, software module, or both, known in the art to be capable of analyzing DIAL measurements in order to characterize gas in a region of interest.

Figure 9:
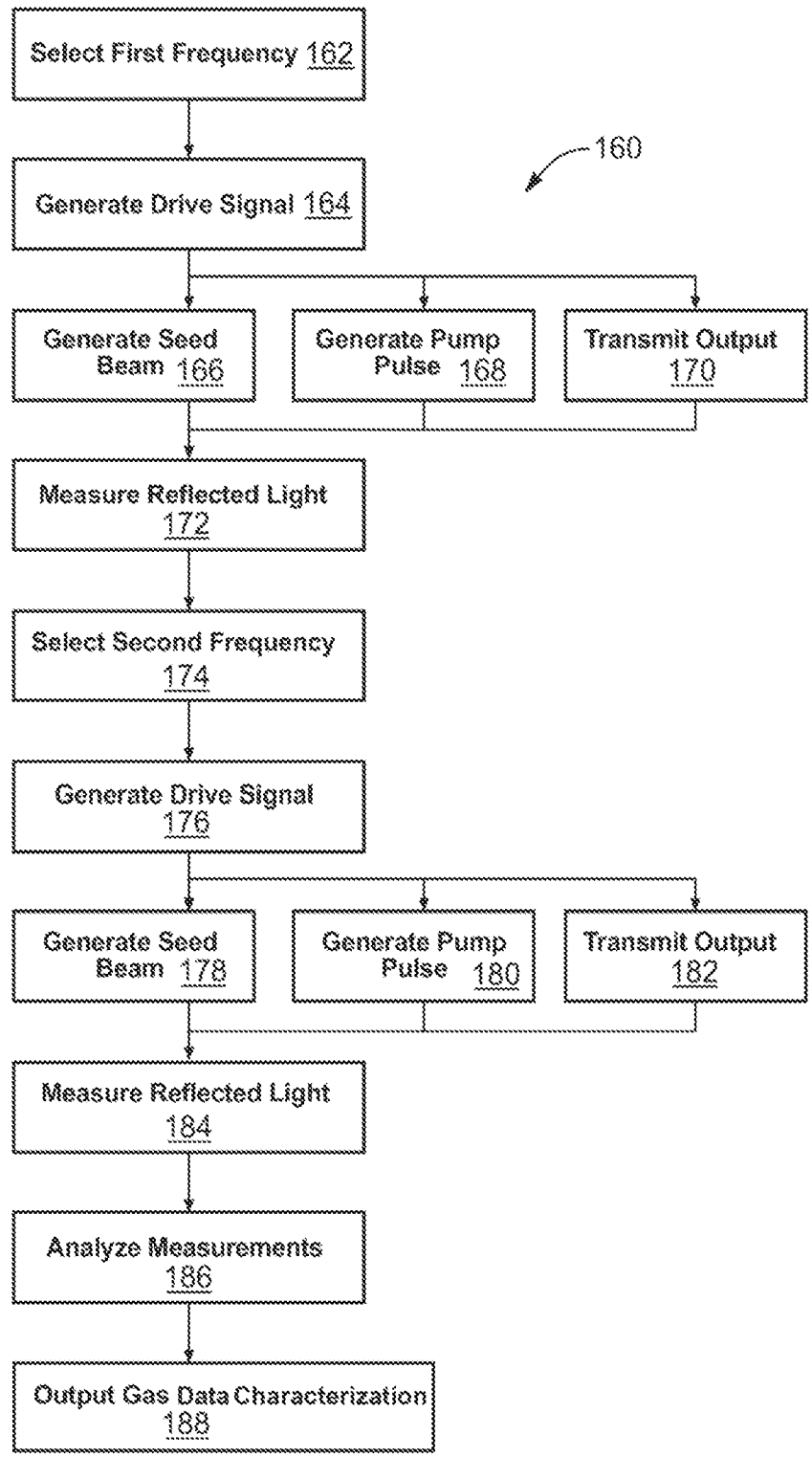
FIG. 9 is a process flow diagram of an embodiment of a method for operating a DIAL system in accordance with the present disclosure.

Referring to FIG. 9, a DIAL system, such as the DIAL system 130, may be used to perform the illustrated method 160. A first frequency or wavelength is selected 162. The first frequency may be a high absorption frequency for a gas of interest, e.g., a frequency at which the gas of interest has an absorption within about 10% of its peak absorption for the absorption band containing the first frequency. The first frequency may also be a low absorption frequency, for example, a frequency at which the gas of interest has an absorption substantially less, (e.g., less than about 90% of the peak) absorption for the absorption band closest to the first frequency.

A drive signal for the seed laser 20 is then generated 164 effective to cause the seed laser 20 to emit the frequency previously selected 162. The seed laser 20 is driven with the drive signal to generate 166 a seed beam having the first frequency. A pump pulse is also generated 168 such that the pump pulse overlaps substantially in time with the seed beam generated at step 166. The output of an OPO is then transmitted 170 toward a region of interest. Light backscattered from the region of interest is then measured 172.

A second frequency or wavelength is selected 174, and a corresponding drive signal is generated 176, followed by generation 178 of a seed beam having the second frequency. The second frequency may have an absorption for the gas of interest that is less than or equal to about 10% that of the first frequency. The order may be reversed and the first frequency may have an absorption for the gas of interest that is less than or equal to about 10% of that of the second frequency. A pump pulse is also again generated 180 such that the second pulse overlaps substantially in time with the seed beam generated at step 178. The output of the OPO 16 is then again transmitted 182 toward the region of interest. Again, light reflected from the region of interest is then measured 184.

The measurements taken at steps 172 and 184 are then analyzed 186 to characterize the concentration of the gas of interest in the region of interest according to methods known in the art of DIAL analysis. Data characterizing the gas of interest within the region of interest may then be output 188 in a human or computer readable form.

Figure 10:
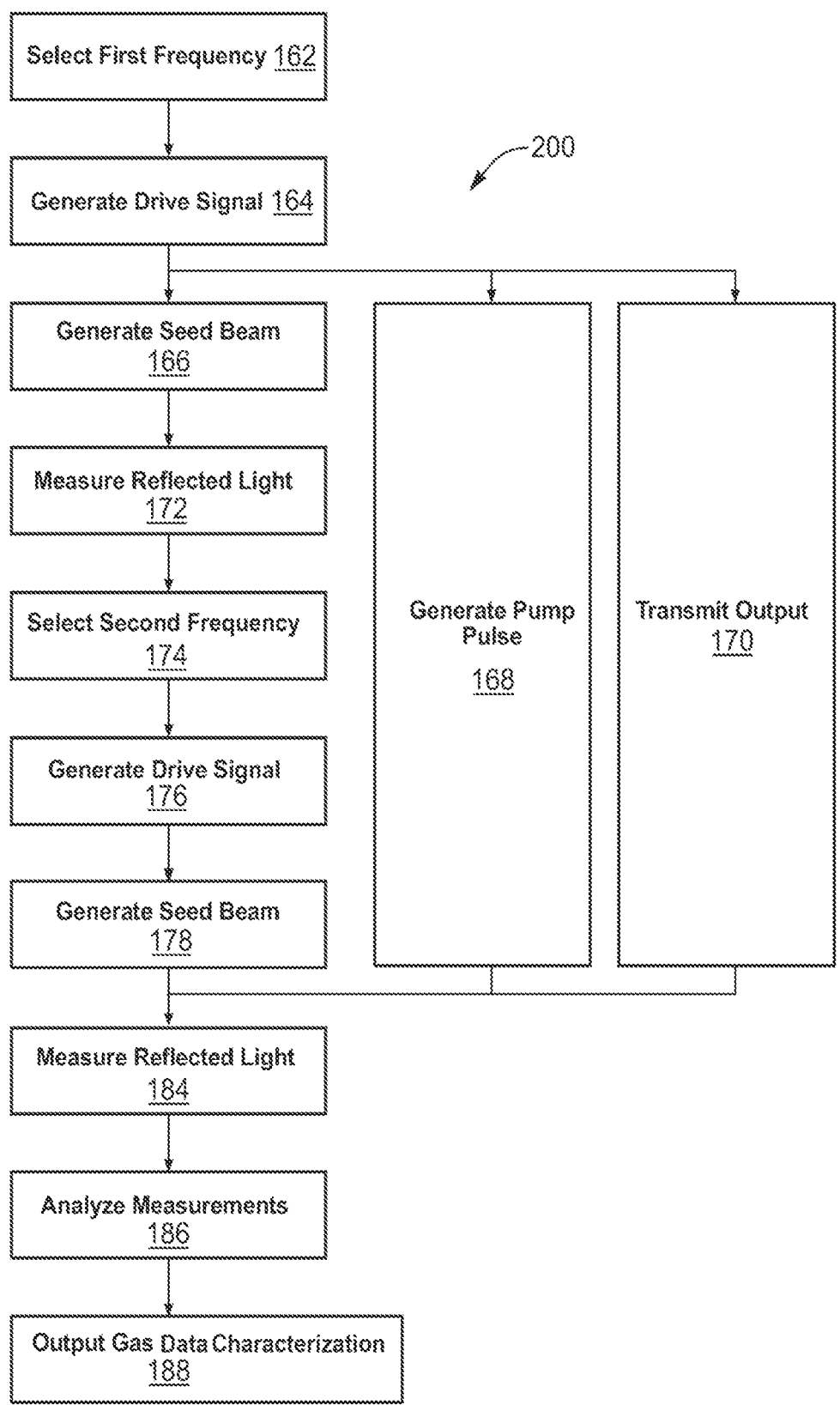
FIG. 10 is a process flow diagram of an embodiment of an alternative method for operating a DIAL system in accordance with the present disclosure.

Referring to FIG. 10, in an alternative embodiment, a method 200 may be identical to other methods, with the exception of generating 168 the pump pulse and transmitting 170 the output of the OPO 16. Due to the novel tuning methods disclosed herein, modulation of the output frequency of the OPO 16 may be faster than the pulse rate or the inverse of the pulse duration. Accordingly, generating 168 the pump pulse and transmitting 170 the output of the OPO 16, may substantially overlap in time both generating 166 the seed beam at the first frequency and generating 178 the seed beam at the second frequency, such that the second pulse generation step 180 and second transmitting step 182 may be omitted.

Accordingly, the output 56 of the OPO 16 corresponding to a single pump pulse will include portions at the first frequency and at the second frequency. Measuring 172 backscattered light and measuring 184 the backscattered light may occur at appropriate times to measure the portion of reflected light corresponding to portions of the OPO output 56 corresponding to the first and second frequencies, respectively.

Figure 11:
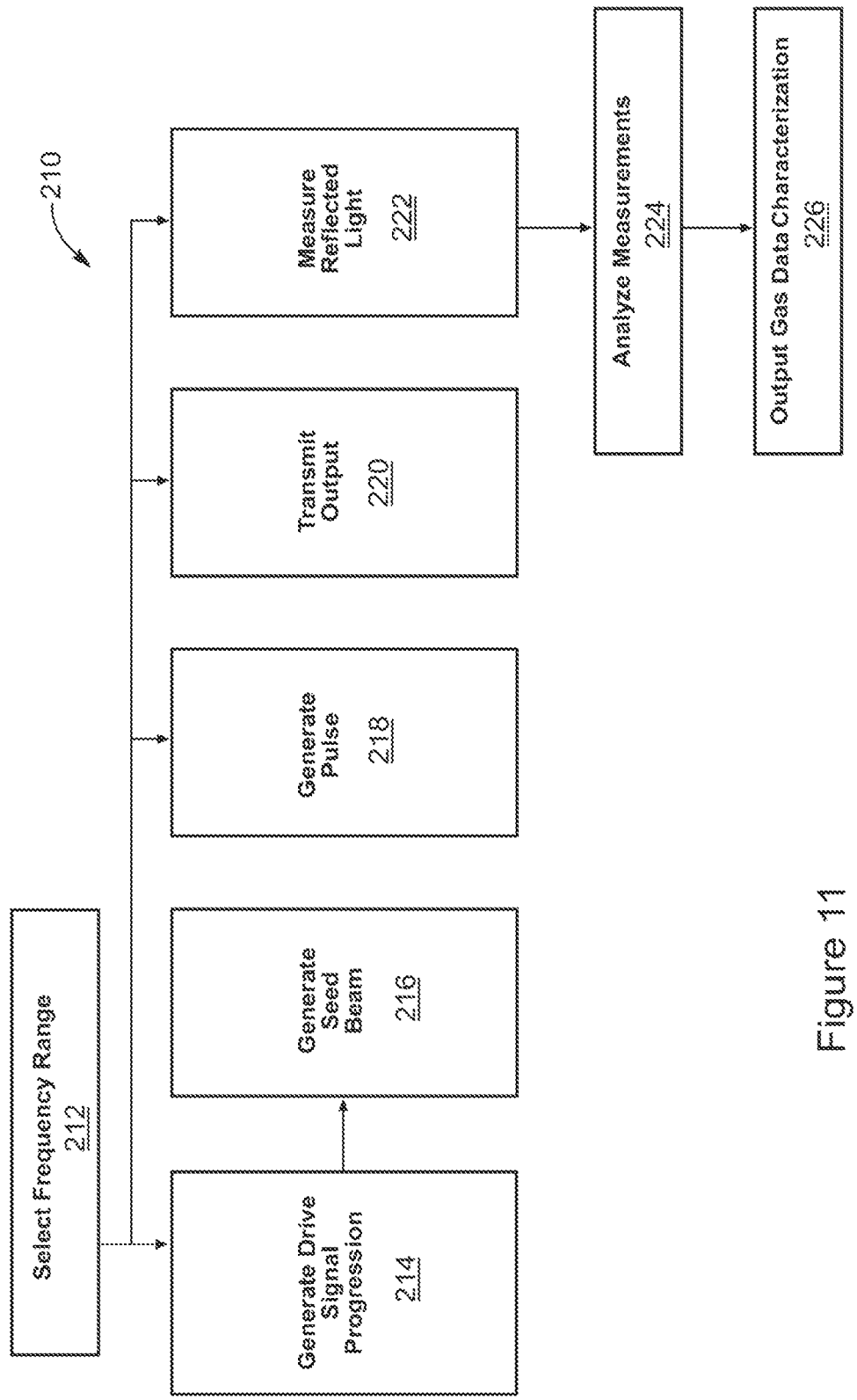
FIG. 11 is a process flow diagram of an embodiment of another alternative method for operating a DIAL system in accordance with the present disclosure.

FIG. 11 illustrates an alternative method 210 for performing DIAL analysis. In the method 210, a frequency or wavelength range is first selected 212. The frequency range may include frequencies of both high absorption and low absorption for the gas of interest. For example, the frequency range may include first and second frequencies such that absorption at one of the frequencies is less than 10% of that of the other frequency. One of the first and second frequencies may have an absorption that is within 90% of the peak absorption of the absorption band of the gas of interest closest to that frequency.

A drive signal progression is generated 214 that will cause the seed laser 20 to sweep through the frequency range that was selected 212. In response to the drive signal, the seed laser 20 will generate 216 a seed beam 44 that sweeps through the selected frequency range. While the seed beam 44 is being generated 216, a pump pulse is also generated 218 using the pump laser 18. The pump pulse preferably substantially overlaps in time the generation 216 of the seed beam.

As a result of generation 216 of the seed beam and generation 218 of the pump pulse, an output beam is transmitted 220 to a region of interest. Light backscattered from the region of interest is repeatedly measured 222. The measurements are then analyzed 224 to determine the absorption at various frequencies within the frequency range that was selected 212. Thus one may characterize the concentration of the gas of interest in the region of interest. Data characterizing the gas of interest within the region of interest may then be output 226 in a human or computer readable form.

Figure 12:
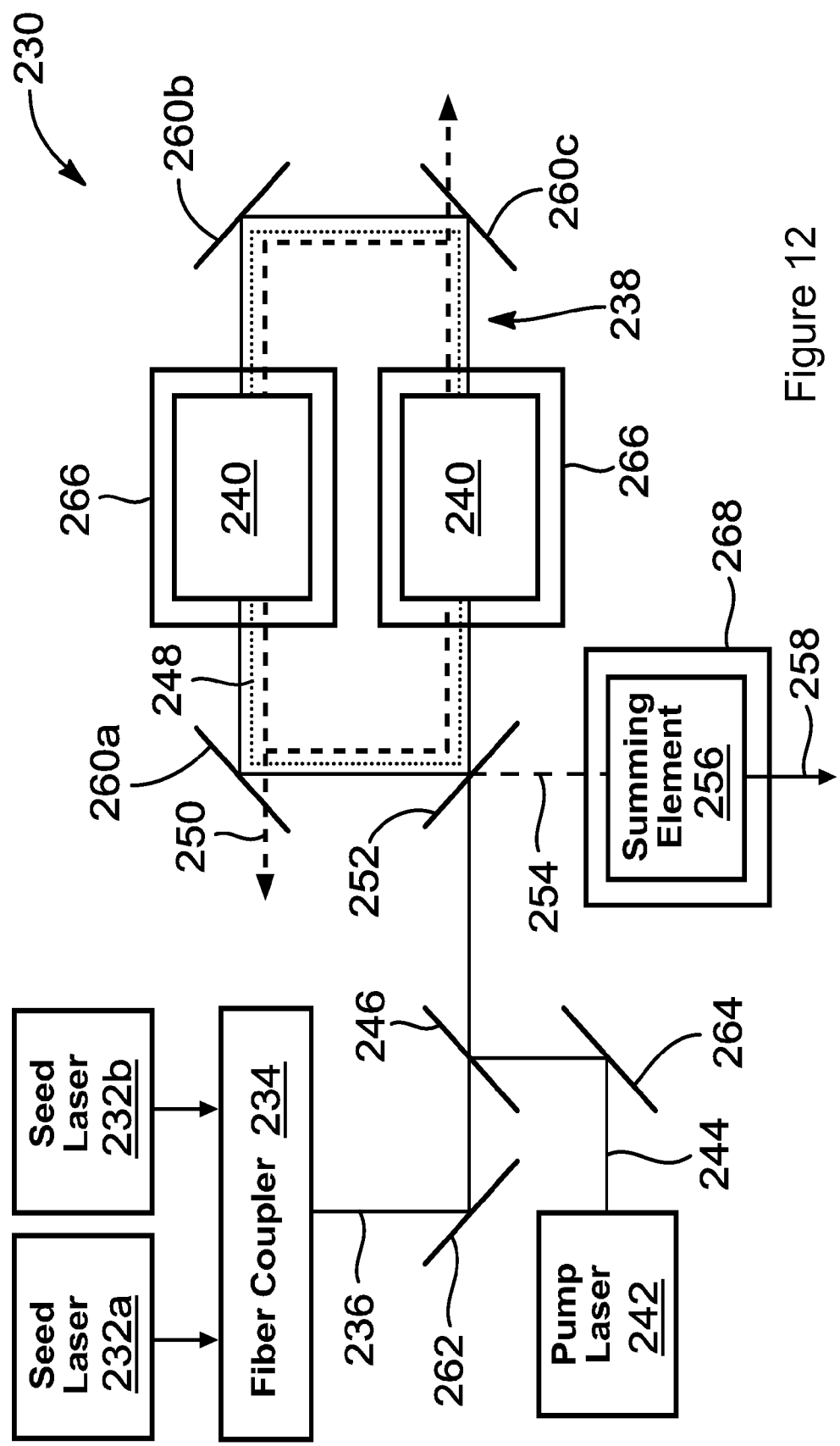
FIG. 12 is a schematic block diagram of another embodiment of an OPO operable for generating light in the range from NIR to UV in accordance with the present disclosure.

Referring to FIG. 12, another embodiment of an OPO 230 may be suitable for use in accordance with any of the methods and systems described above. The illustrated OPO 230 is particularly useful for generating output beams within the ultraviolet (UV) to the near infrared (NIR) range. The OPO 230 may include two or more seed lasers 232a and 232b. As for other embodiments discussed herein, the seed lasers 232a and 232b may be embodied as laser diodes, such as distributed feedback laser diodes. In other embodiments, more than two seed lasers may be used, for example, 3, 4, or more seed lasers may be used. The seed lasers may be formed into an array of seed lasers or the seed lasers may form part of an interchangeable module containing one or more seed lasers capable of operating at different frequencies. Similar to the embodiments described above with respect to seed laser 232, seed lasers 232a and 232b may be driven by one or more controllers (not shown) and may be modulated to emit beams with different frequencies The seed lasers 232a and 232b may emit beams into a coupler, such as a fiber coupler 234, that combines the beams into a combined beam 236. The combined beam 236 may then be input into a resonant cavity 238 having one or more non-linear crystals 240 in the optical path thereof.

In some embodiments, the resonant cavity 238 may be actively stabilized through temperature control or by using a piezo transducer or other line-locking (e.g., dithering) schemes to further enhance the frequency control of the resonant cavity 12. The one or more non-linear crystals 240 may have various attributes including the angle of the crystal or the angle of incidence of the pump beam, or the temperature, pressure or applied voltage on the crystal. In the illustrated embodiment, the non-linear crystals 240 may include Beta barium borate (BBO). However, other non-linear crystals may also be used.

A pump laser 242 may emit a pump beam 244 which is input to the resonant cavity 238. The pump laser 242 may include any type of laser described herein as being suitable for operation as a pump laser. The pump laser may include two or more pump lasers with beams combined through a fiber coupler (not shown). Like the seed lasers, the pump laser may be part of an interchangeable module containing one or more pump lasers capable of operating at different frequencies.

The pump beam 244 may be combined with the combined beam 236 output from the fiber coupler 234, such as by means of a dichroic mirror 246 or other means for combining beams. The dichroic mirror 246 may be highly reflective at the pump beam wavelength and highly transmissive at the seed beams' wavelengths. The pump beam 244 and combined beam 236 may then be input to the resonant cavity 238.

In response to the pump beam 244, the one or more non-linear crystals 240 output a signal beam 248 and an idler beam 250. In practice, the signal beam has a wavelength that is to be used in further stages and represents the desired output of the non-linear crystal 240. The idler beam 250 may be ignored or used to monitor intensity or other parameters.

A dichroic mirror 252 or other structure defining the cavity may emit an output beam 254 from the resonant cavity. The output beam 254 may include some of the signal beam 248 emitted from the non-linear crystals 240. The output beam 254 may be received by a summing element 256. The summing element 256 also receives a portion of the pump beam 244. This may be accomplished by means of a high reflector for both pump and signal at 260a. Upon receiving a portion of the pump beam 244 and a portion of the signal beam 248, the summing element 256 generates an output beam 258, which may be a light beam in the UV to NIR range. The summing element 256 may be embodied as a sum frequency generator.

In some embodiments, the summing element 256 may be embodied as a non-linear crystal, critically phase-matched to be effective to operate as a sum frequency generator (SFG). The summing element 256 may be a non-linear crystal having some or all of the attributes of non-linear crystals discussed above. For example, a non-linear crystal may be bi-axial or uniaxial, or may be frequency tuned through mechanical (e.g., movement, rotation), temperature, or electrical means. In embodiments, the SFG is implemented using Beta barium borate.

The OPO 230 may include additional structures to direct beams and define the cavity 238. For example, the cavity may be defined by three or more mirrors 260a-260c, in addition to the dichroic mirror 252. One or more of the mirrors 260a-260c, such as the mirrors 260a, 260c may also be dichroic mirrors having a frequency response effective to transmit the idler beam wavelength but reflect the signal beam wavelength. In the illustrated embodiments, a mirror 262 directs the combined beam 236 into the dichroic 246 and a mirror 264 directs the pump beam 244 into the dichroic mirror 246. Other mirrors and optical components may also be used to direct beams and define the resonant cavity 238.

As noted above, two seed lasers 232a-232b are positioned to emit seed beams into the resonant cavity. The seed beams 232a-232b may have different wavelengths and different intensities. The separation between the two seed wavelengths may be broader than the gain bandwidth of the non-linear crystals 240 at one, static phase-matching angle. Accordingly, one or both of the non-linear crystals 240 may be mounted or otherwise coupled to an actuator 266 operable to change the angle of the crystal 240 relative to the propagation direction of beams passing through. The change in angle may be in the plane of the diagram of FIG. 12 or out of the plane.

The summing element 256 may likewise be mounted or otherwise coupled to an actuator 268 that is operable to adjust the angle of the summing element 256 relative to the output beam 254. Accordingly, the change in angle may be used to shift the wavelength band in which the summing element 256 is operable to perform this function. The change in angle may be in the plane of the diagram of FIG. 12 or out of this plane. The actuators 266, 268 may be coupled to a controller (not shown) or other component operable to generate an oscillating signal. The controller or other actuator may be programmed to drive the actuators 266, 268 in a manner to select one of the two seed wavelengths for the signal beam 248. The actuators 266, 268 may be implemented using a compliant actuator, such as a piezoelectric actuator.

As noted above, the seed beams are operable to select one of the lasing modes of the resonant cavity. In the embodiment of FIG. 12, actuation of the non-linear crystals 240 is performed to be effective to select which of the two seed beam wavelengths is followed by the signal beam 248. Likewise, actuation of the summing element 256 may be performed effective to alter the angle of the summing element 256 such that the summing element 256 performs summing of a portion of the pump beam 244 and a portion of the signal beam 248 having the seed beam wavelength.

The illustrated configuration is operable to achieve relatively broadband operation. For example, the output of the summing element 256 may be a UV beam that is modulated between wavelengths separated by greater than 0.5 nm.

In one example of FIG. 12, the seed lasers 232a-232b were implemented using two DFB laser diodes tuned to wavelengths of 868.5 and 879.3 nm, respectively. The pump laser 242 was implemented using a 355 nm single longitudinal mode (SLM) yttrium aluminum garnet (YAG) laser. In this configuration, the output of the summing element 256 was a UV beam modulated between 252.9 and 252 nm. The illustrated setup is further capable of achieving a tuning range of from about 250.5 to about 254.5 nm.

The output of the OPO 230 may be used to perform LIDAR and DIAL measurements according to some or all of the methods described herein. The UV wavelengths achievable using the OPO 230 may be particularly useful for measuring sulfur dioxide ($SO_2$). Other wavelengths from UV to NIR may be useful for measuring $CO_2$, $CH_4$, $NO_x$, $SO_x$, HCN, $H_2O$, $O_3$, Benzene, $H_2S$, or Toluene. The OPO 230 may be used to generate a modulated output that modulates the wavelength of the output of the OPO at a frequency greater than or equal to a pulse frequency of the pump laser 242. Backscattered light responsive to each pulse may then be used to perform DIAL measurements as described above.

Alternatively, the wavelength of the output of the OPO 230 may be modulated and measurements made faster than an inverse of the pulse duration of pulses output from the pump laser 242. This may enable inter-pulse measurements as described above with respect to FIGS. 10 and 11.

Figure 13:
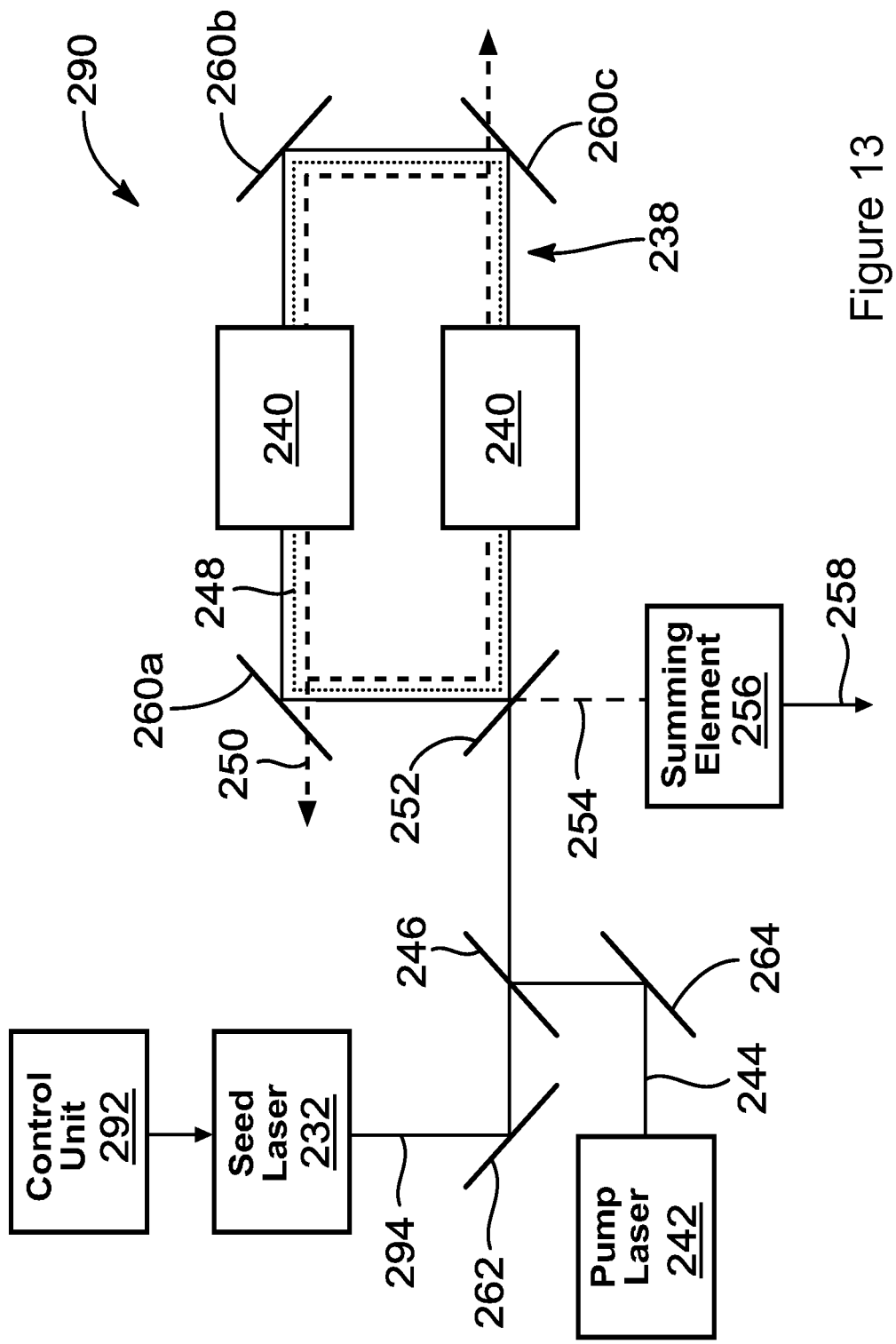
FIG. 13 is a schematic block diagram of an OPO operable for generating light in the UV range in accordance with the present disclosure.

Referring to FIG. 13, an alternative embodiment of an OPO 290 may be suitable for operation in the UV range. The OPO 290 may include a controller 292 that controls a seed laser 232, such as by controlling an amount of current supplied to the seed laser 232. As for other embodiments disclosed herein, the seed laser 232 may be a laser diode, such as a distributed feedback laser diode. The seed laser 232 generates a seed beam 294 that is input to the resonant cavity 238 along with the pump beam 244. Similar to the embodiment of FIG. 12, the pump beam 244 and seed beam 236 circulate in the resonant cavity 238 and are transmitted through one or more non-linear crystals 240, which results in a signal beam 248 and an idler beam 250.

Similar to the embodiment of FIG. 12, a summing element 256 receives a portion of the pump beam 244 as well as a portion of the signal beam 248. The summing element 256 is operable to convert the received portions of the pump beam 244 and signal beam 248 into a UV beam 258. In contrast to the embodiment of FIG. 12, both the non-linear crystals 240 and summing element 256 may be fixed relative to the resonant cavity 238. The position and orientation of the non-linear crystals 240 and summing element 256 may be adjustable relative to the resonant cavity 238 during setup or calibration but may remain fixed during operation. Accordingly, the actuators 266, 268 may be omitted or unused during operation.

Similar to the embodiment of FIG. 12, the summing element 256 may be embodied as a sum frequency generator (SFG) 256. Both the summing element 256 and the non-linear crystals 240 may be embodied as any of the materials noted herein as suitable for operation as non-linear crystals. In some embodiments, both the summing element 256 and non-linear crystals 240 are embodied as Beta barium borate (BBO). As for the embodiment of FIG. 12, the non-linear crystals and the SFG 256 are critically phase matched. However, one phase-matching angle is used in the operation of the device.

In the embodiment of FIG. 13, the seed laser beam 294 selects a lasing wavelength from the lasing modes of the resonant cavity 238. Modulation of the seed laser wavelength results in modulation of the signal wavelength. As for other embodiments disclosed herein, the signal wavelength may be substantially equal to the seed laser wavelength.

The summing element 256 may have an acceptance band at which the summing element 256 is capable of functioning as a summing element 256. Accordingly, modulation of the seed laser wavelength may be constrained to maintain the signal wavelength within this acceptance band. Likewise, modulation of the seed laser wavelength may be constrained to lie within the band of lasing wavelengths at which the combination of the resonant cavity 238 and non-linear crystals 240 is capable of generating a signal beam 248 in response to the pump beam 244.

In one exemplary setup, a seed laser 232 was implemented using an 845 nm DFB laser diode and the pump laser 242 was implemented using a 355 nm SLM YAG laser. Using these components, a 250 nm UV output beam 258 was obtained with narrow linewidth. Modulation of up to about 0.5 nm was obtained. Using the embodiment of FIG. 13, UV beam wavelength modulation bandwidth may be achieved up to 0.5 nm. For example, the UV beam wavelength may be modulated in a band from about 0.3 and to about 0.5 nm in response to modulation of the seed laser wavelength. In response to the seed laser modulation, a UV beam emitted by the OPO 290 may be modulated at a frequency as large as 1 kHz, 1 MHz, or 1 GHz (e.g., 1, 2, 3, 4, 5, 6, 7, 8, 9, or 10 GHz).

The output of the OPO 290 may be used to perform Light Detection And Ranging (LIDAR) and Differential Absorption LIDAR (DIAL) measurements according to some or all of the methods described herein. The UV wavelengths achievable using the OPO 290 may be particularly useful for measuring sulfur dioxide ($SO_2$). Other wavelengths achievable through OPO 290 may be useful for measuring $CO_2$, $CH_4$, $NO_R$, $SO_x$, HCN, $H_2O$, $O_3$, Benzene, $H_2S$, or Toluene. The OPO 290 may be used to generate a modulated output that modulates the wavelength of the output of the OPO at a frequency greater than or equal to a pulse frequency of the pump laser 242. Backscattered light responsive to each pulse may then be used to perform DIAL measurements as described hereinabove.

Alternatively, the wavelength of the output of the OPO 290 may be modulated and measurements made faster than an inverse of the pulse duration of pulses output from the pump laser 242. This may enable inter-pulse measurements as described above with respect to FIGS. 10 and 11.

Embodiments of the present disclosure may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A laser system comprising:
    a pump laser configured to generate a pump beam having a pump wavelength and a pulse repetition frequency (PRF);
    a resonant cavity positioned to receive a first portion of the pump beam;
    a non-linear crystal positioned within the resonant cavity such that the non-linear crystal and resonant cavity have a band of lasing wavelengths including wavelengths other than the pump wavelength, the non-linear crystal operable to output a signal beam in response to the first portion of the pump beam;
    a seed laser positioned to emit a seed signal into the resonant cavity, the seed signal having a seed wavelength and the seed wavelength being within the band of lasing wavelengths;
    a seed laser controller electrically coupled to the seed laser and programmed to modulate the seed wavelength at the PRF of the pump laser; and
    a sum frequency generator (SFG) positioned to receive a second portion of the pump beam and a portion of the signal beam, the SFG operable to output an output beam in response to the second portion of the pump beam and the portion of the signal beam
    an SFG actuator controller electrically coupled to an SFG actuator the SFG actuator controller programmed to modulate the output beam by driving the SFG actuator;
    wherein the output beam is an ultraviolet (UV) beam with a wavelength that is modulated in a band from about 0.5 to about 4 nanometers.

2. The laser system of claim 1, wherein the output beam can be modulated at a frequency between about 10 Hz and about 1 GHz.

3. The laser system of claim 1, wherein the output beam is an ultraviolet (UV) beam with a wavelength that is modulated in a band from about 0.3 to about 0.5 nm.

4. The laser system of claim 1, wherein the non-linear crystal is fixed relative to the resonant cavity.

5. The laser system of claim 1, wherein the seed laser comprises a first seed laser configured to emit a first seed signal having a first seed wavelength and a second seed laser configured to emit a second seed signal having a second seed wavelength, both the first and second seed lasers positioned to emit their respective signals into the resonant cavity, and both the first and second seed wavelengths being within the band of lasing wavelengths.

6. The laser system of claim 5, further comprising a crystal actuator controller electrically coupled to the crystal actuator, the crystal actuator controller programmed to modulate the output beam by driving the crystal actuator.

7. The laser system of claim 1, further comprising a crystal actuator coupled to the non-linear crystal.

8. A method for operating a laser comprising:
    generating a pump beam at a pump wavelength and a pump pulse repetition frequency (PRF);
    transmitting a first portion of the pump beam into a resonant cavity having a non-linear crystal in an optical path thereof, the non-linear crystal operable to emit a signal beam in a band of lasing wavelengths that includes wavelengths different from the pump wavelength;
    generating a seed beam having a seed wavelength lying within the band of lasing wavelengths;
    modulating the seed wavelength at a frequency greater than or equal to the pump PRF;
    transmitting the seed beam into the resonant cavity;
    transmitting a portion of the signal beam and a second portion of the pump beam into a sum frequency generator (SFG);
    modulating with an SFG actuator an output beam; and
    outputting the output beam from the SFG in a band from about 0.5 to about 4 nanometers.

9. The method of claim 8, wherein modulating the seed wavelength causes a corresponding modulation of an output wavelength of the output beam.

10. The method of claim 8, wherein the output beam is a UV beam and modulating the seed wavelength causes a corresponding modulation of the UV beam in a band between about 0.3 and 0.5 nanometers wide.

11. The method of claim 8, wherein:
    generating the seed beam comprises activating a laser diode; and
    modulating the seed wavelength comprises modulating current supplied to the laser diode.

12. The method of claim 8, wherein the output beam can be modulated at a frequency between about 10 Hz and about 1 GHz.

13. A method for operating a laser comprising:
    generating a pump beam with a pump beam wavelength at a pump pulse repetition frequency (PRF);
    transmitting the pump beam into a resonant cavity having a non-linear crystal in an optical path thereof, the non-linear crystal being operable to emit a signal beam in a band of lasing wavelengths that includes wavelengths different from the pump beam wavelength;
    generating a first seed beam having a first seed wavelength lying within the band of lasing wavelengths;

generating a second seed beam having a second seed wavelength lying within the band of lasing wavelengths, the second seed wavelength being different from the first seed wavelength;

transmitting the first and second seed beams into the resonant cavity;

transmitting a portion of the signal beam and a portion of the pump beam into a sum frequency generator (SFG);

outputting an output beam having an output beam wavelength from the SFG; and modulating the output beam wavelength by actuating the non-linear crystal.

14. The method of claim 13, wherein modulating the output beam wavelength comprises actuating the non-linear crystal effectively to modulate the output beam wavelength at a frequency greater than or equal to the pump PRF.

15. The method of claim 13, wherein actuating the non-linear crystal comprises actuating the non-linear crystal effective to modulate the signal beam between the first seed wavelength and the second seed wavelength.

16. The method of claim 15, further comprising actuating the SFG in correspondence with actuation of the non-linear crystal.

17. The method of claim 16, wherein the output beam is a UV beam and actuating the non-linear crystal comprises actuating the non-linear crystal effective to modulate the wavelength of the UV beam over a range from about 0.5 to about 4 nanometers.

18. A gas characterization system comprising:

a pump laser configured to generate a pump beam having a pump wavelength at a pulse repetition frequency (PRF);

a resonant cavity positioned to receive a first portion of the pump beam;

a non-linear crystal positioned within the resonant cavity such that the non-linear crystal and resonant cavity have a band of lasing wavelengths including wavelengths other than the pump wavelength, the non-linear crystal operable to output a signal beam in response to the pump beam;

a seed laser positioned to emit a seed signal into the resonant cavity, the seed signal having a seed wavelength being within the band of lasing wavelengths;

a seed laser controller electrically coupled to the seed laser and programmed to modulate the seed wavelength at a frequency at least as great as the PRF;

a sum frequency generator (SFG) positioned to receive a second portion of the pump beam and a portion of the signal beam, the SFG operable to output an output beam in response to the second portion of the pump beam and the portion of the signal beam;

an SFG actuator controller electrically coupled to an SFG actuator the SFG actuator controller programmed to modulate the output beam by driving the SFG actuator;

wherein the output beam is an ultraviolet (UV) beam with a wavelength that is modulated in a band from about 0.5 to about 4 nanometers;

a detector configured for receiving a reflected portion of the output beam from a region of interest;

a measurement module configured to receive an output from the detector and produce a measurement of the reflected portion of the output beam; and an analysis module configured to analyze the measurement from the measurement module and characterize a gas in the region of interest.

* * * * *